United States Patent [19]

Craighead et al.

[11] Patent Number: 5,520,568
[45] Date of Patent: May 28, 1996

[54] METHOD OF PROCESSING A LENS AND MEANS FOR USE IN THE METHOD

[75] Inventors: Lawrence W. Craighead, Mendota Heights; James A. Weldon, Eagan, both of Minn.; Forrest J. Rouser, San Rafael, Calif.; Debra L. Wilfong, Lake Elmo, Minn.

[73] Assignee: Minnesota Mining and Manufacturing Company, Saint Paul, Minn.

[21] Appl. No.: 275,937

[22] Filed: Jul. 15, 1994

Related U.S. Application Data

[62] Division of Ser. No. 916,195, Jul. 17, 1992, abandoned.

[51] Int. Cl.$^6$ .............................. B24B 1/00; B24B 13/005
[52] U.S. Cl. .............................. 451/42; 451/43; 451/390; 24/575; 24/577
[58] Field of Search ......................... 428/141, 40, 352, 428/99, 119, 161, 162, 163, 179; 51/283 R, 284 R, 284 E, 283 E, 406; 24/575, 576, 577; 156/153, 154, 247; 451/42, 43, 44, 390, 255, 256, 277, 323

[56] References Cited

U.S. PATENT DOCUMENTS

| | | | |
|---|---|---|---|
| Re. 24,906 | 12/1960 | Ulrich | 206/59 |
| Re. 31,897 | 5/1985 | Johnson | 51/284 |
| 2,465,153 | 3/1949 | Fritzsche . | |
| 2,680,697 | 6/1954 | Fritzsche | 134/5 |
| 3,091,062 | 5/1963 | Suddarth | 51/277 |
| 3,332,172 | 7/1967 | Stern | 51/101 |
| 3,468,366 | 9/1969 | Suddarth . | |
| 3,673,738 | 7/1972 | Stern | 51/93 |
| 3,689,346 | 9/1972 | Rowland | 156/245 |
| 3,704,558 | 12/1972 | Sarofeen | 51/216 |
| 3,732,647 | 5/1973 | Stith | 51/54 |
| 3,794,314 | 2/1974 | Coburn et al. | 269/21 |
| 3,869,764 | 3/1975 | Tanaka et al. | 24/204 |
| 3,962,833 | 6/1976 | Johnson | 51/284 |
| 3,994,101 | 11/1976 | Coburn et al. | 51/216 |
| 4,019,285 | 4/1977 | Gravell | 51/216 |
| 4,203,259 | 5/1980 | Haddock | 51/97 |

(List continued on next page.)

FOREIGN PATENT DOCUMENTS

| | | |
|---|---|---|
| 2127344 | 4/1984 | United Kingdom . |
| 2230983 | 11/1990 | United Kingdom . |

OTHER PUBLICATIONS

Pp. 32–102 of the book entitled, "Understanding Lens Surfacing", Butterworth/Heinemann (Reed Publishing) (1992), Clifford W. Brooks, O.D., ISBN #0–7506–9177–8.
Chapter 9, 135–151 of the book entitled, "Understanding Lens Surfacing", Butterworth/Heinemann (Reed Publishing) (1992), Clifford W. Brooks, O.D., ISBN #0–7506–9177–8.
Pp. 15, 16 and 17 of the document entitled, "How to Surface Optical Plastic Lenses for Prescription Eyewear," Second Edition (Chemical Industries) (1979) from PPG Industries, Pittsburg, Pennsylvania.
A four page document entitled, "Optical Lens Processing", Minnesota Mining and Manufacturing Company (3M) of St. Paul, Minnesota.
Document entitled, "3M's Second Fine Just Got Finer", Minnesota Mining and Manufacturing Company (3M), St. Paul, Minnesota (2 pages).
"Understanding Lens Surfacing", by Clifford W. Brooks, 1992.

Primary Examiner—D. S. Nakarani
Assistant Examiner—Vivian Chen
Attorney, Agent, or Firm—Gary L. Griswold; Walter N. Kirn; Jeffrey J. Hohenshell

[57] ABSTRACT

A method of processing a lens is disclosed. A lens blank and a lens block are each provided with a structured surface having a plurality of tapered elements. The lens blank is releasably attached to the lens block by pressing the structured surface of the lens blank against the structured surface of the lens block, followed by subjecting the mounted lens blank to lens processing operations.

9 Claims, 9 Drawing Sheets

U.S. PATENT DOCUMENTS

| | | | |
|---|---|---|---|
| 4,242,162 | 12/1980 | Ronning et al. | 156/212 |
| 4,244,683 | 1/1981 | Rowland | 425/143 |
| 4,287,013 | 9/1981 | Ronning | 156/242 |
| 4,319,846 | 3/1982 | Henry et al. | 356/401 |
| 4,328,060 | 5/1982 | Tusinski et al. | 156/344 |
| 4,518,643 | 5/1985 | Francis | 428/131 |
| 4,576,850 | 3/1986 | Martens | 428/156 |
| 4,871,623 | 10/1989 | Hoopman et al. | 428/284 |
| 4,875,259 | 10/1989 | Appeldorn | 24/576 |
| 4,901,480 | 2/1990 | Dillon | 51/209 |
| 4,908,997 | 3/1990 | Field, Jr. et al. | 51/284 |
| 4,925,518 | 5/1990 | Wasserman et al. | 156/295 |
| 5,005,633 | 4/1991 | Mathews et al. | 164/334 |
| 5,096,969 | 3/1992 | Payne et al. | 525/222 |
| 5,109,638 | 5/1992 | Kime, Jr. | 51/401 |
| 5,196,266 | 3/1993 | Lu et al. | 428/355 |
| 5,201,101 | 4/1993 | Rouser et al. | 24/575 |
| 5,204,160 | 4/1993 | Rouser | 428/167 |
| 5,234,740 | 8/1993 | Reeves et al. | 428/167 |
| 5,316,849 | 5/1994 | Lu et al. | 428/355 |
| 5,344,177 | 9/1994 | Rouser et al. | 280/610 |
| 5,360,270 | 11/1994 | Appeldorn et al. | 383/5 |

METHOD OF PROCESSING A LENS AND MEANS FOR USE IN THE METHOD

This is a divisional of U.S. patent application Ser. No. 07/916,195 filed Jul. 17, 1992, now abandoned.

BACKGROUND

The art is replete with methods for processing or altering a lens. The processed or altered lenses may be used for any suitable purposes such as but not limited to spectacle, camera, telescope and binocular lenses.

FIG. 1 illustrates an example of a prior art method for processing an ophthalmic lens. After a particular lens is ordered 1, a job tray is selected 2 which contains the appropriate lens blank, frame and job ticket. In this example, a semi-finished lens blank is chosen (e.g., one that is ground and polished on one of its two faces). However, the lens blanks may be provided in a variety of forms, such as, but not limited to spherical, cylindrical, optical flats aspherical, multifocal, etc.

Step 3 is lens marking or layout. For example, the optical center, and optionally the cylinder axis, of the lens blank are located and marked on the face thereof. This step may be accomplished using the known procedures described on pages 32–102 of the book entitled, "Understanding Lens Surfacing", Butterworth Heinemann (Reed Publishing) (1992), Clifford W. Brooks O.D., ISBN #0-7506-9177-8 herein expressly incorporated by reference in its entirety.

Next, in step 4, tape such as the tape described in U.S. Pat. No. 4,287,013 (the entire contents of which are herein incorporated by reference) or Surface Saver T.M. tape (generally available from the Minnesota, Mining and Manufacturing Co., 3M, of St. Paul, Minn.) is placed on the finished face of the semi-finished lens blank. The tape applying device described in U.S. Pat. No. 4,242,162 (the entire contents of which are herein expressly incorporated by reference) or the Surface Saver T.M. Applicator generally available from the Minnesota Mining and Manufacturing Co., 3M, of St. Paul, Minn. may be used to apply the tape to the lens blank.

In step 5, the lens blank is attached to a lens "generator block" such that the optical center (and optionally the cylinder axis) of the lens blank are aligned with the center point and cylinder axis of the generator block. The generator block is used to hold the lens in place during the surfacing or "generating" process. In this example, the lens/tape subassembly is attached to the "block" by using a low melting temperature alloy. For example, one typical alloy having a melting point of approximately 117 degrees fahrenheit is constructed from the following combinations of metals: 45% bismuth, 23% lead; 8% tin, 5% cadmium, 19% indium. Other alloys include other metals such as antimony.

The alloy is injected in liquid form between the generator block and the tape and conforms to the finished face of the semi-finished lens blank. A "blocking machine" such as the Coburn Rocket Model 95A, generally available from Coburn Optical Industries of Muskogee, Okla. or generally the machines described in U.S. Pat. Nos. 2,465,153, 3,468,366, 4,319,846 and 5,005,633 may be used to attach the lens/tape subassembly to a lens block.

The use of a low melt temperature alloy to attach the lens blank/protective tape subassembly to the lens block suffers from drawbacks including the following: (1) the particular alloy should be carefully selected to prevent heat damage such as cracking of glass lenses or warping of plastic lenses, and also to prevent the creation of a thermal pattern in a plastic lens, (2) the alloy systems tend to be time consuming as the alloy must be heated to a molten state and then cooled to a solid state before the lens blank/protective tape subassembly is attached to the block, this also requires the use of special equipment to heat and cool the alloys (3) the alloys tend to be expensive to use requiring the use of special equipment to recover the alloys for reuse later, and (4) the alloys include hazardous material which require special care to prevent overexposure of workers and which require special disposal equipment.

Alternatives to a metal alloy blocking system are also known in the art. For example, an epoxy/cure system or a low melting temperature wax/Calcium Carbonate system may be used as a mounting agent. Also, the material described in U.S. Pat. No. 5,096,969 is said to be appropriate for such purposes. However, heating and cooling and its associated disadvantages are present even with the wax/Calcium Carbonate system. Although the epoxy/cure system does not suffer from the drawbacks associated with heating and cooling the metal alloy or wax, this method requires "down time" for the epoxy to set.

Steps 6, 7 and 8 are steps wherein the semi-finished block is machined to the appropriate shape by tools well known in the art such as the tools described in U.S. Pat. Nos. 3,732,647; 4,901,480; and 4,908,997 or any suitable, well known tool such as the generator, polishing and fining tools available from FB Optical of St. Cloud, Minn., CDP Diamond Products Inc. of Livonia, Mich., or Coburn Optical Industries Inc. of Muskogee, Okla.

Next the lens/protective tape subassembly is removed from the lens generator block in step 9 by methods known in the art. Typically, an operator will use a "shock" technique wherein a special tool is used to impulsively impact a hard object such as a table or workbench to separate the generator block from the lens/tape subassembly. This technique is undesirable for some users. Alternatively, a mechanical tool such as the tool shown in U.S. Pat. No. 3,091,062 may be used to remove the lens from the generator block.

Prior to steps 10 and 11, the protective tape is removed from the lens by manually peeling it off the surface. In steps 10 and 11, the power of the lens is checked for accuracy and options such as abrasion resistance, anti-reflective and hydrophobic properties may be incorporated into the lens.

Step 12 is applying the lens to an "edging block" in preparation for edging the lens. The edging block is typically smaller than the generator block. If not previously accomplished, the optical center and (optionally the cylinder axis) are located and marked on a face of the lens. The lens is then attached to the edging block by a holding mechanism which is well known in the art. For example, the method and devices used in U.S. Pat. No. 3,962,833 and its Reissue (U.S. Pat. No. Re. 31,897) may be used (the entire contents of each patent are herein expressly incorporated by reference), or the LEAP T.M. System generally available from the Minnesota Mining and Manufacturing Co. (3M) of St. Paul, Minn. may be used. The LEAP T.M. System utilizes an adhesive pad coated on two sides with an adhesive to attach the lens to the edging block.

Steps 13, 14 and 15 include machining the peripheral edge of the lens to the desired shape so that it may be placed in the desired frame. Optionally the lens may be tinted. These steps may be accomplished by means well known in the art such as by using the methods and apparatus described in U.S. Pat. Nos. 3,332,172, 3,673,738 and 4,203,259 or any of the machines generally available from Coburn Optical Industries, Inc. of Muskogee, Okla. for those purposes.

Prior to final inspection in step 16, the lens is removed from the edging block by means well known in the art such as the device and method described in U.S. Pat. No. 4,328, 060 or by using the LEAP T.M. deblocker generally available from the Minnesota Mining and Manufacturing Co. (3M) of St. Paul, Minn.

Other devices useful in a process for altering a lens are described in U.S. Pat. Nos. 3,704,558, 3,794,314, 3,994,101 and 4,925,518.

U.S. Pat. No. 4,875,259 describes intermeshable articles and is herein expressly incorporated by reference in its entirety. This patent will be discussed infra.

DISCLOSURE OF THE INVENTION

The present invention is directed to a lens blank or a lens block for use in a process for altering or processing the lens blank that uses a processing (e.g. a machining) means and the lens block. The lens blank comprises first and second major side surfaces and a peripheral edge surface. The lens block comprises a housing having a first mounting surface for releasably attaching the lens block to the processing means.

Mechanical attachment means are provided for releasably attaching the lens block to the lens blank at an interface between the lens blank and block. The mechanical attachment means is free of adhesives, waxes or alloys which require setting or heating or cooling time which slows the process for altering the lens.

The mechanical attachment means comprises either the lens blank or the lens block having a structured surface for releasably attaching the lens blank to the lens block.

The structured surface preferably comprises a plurality of tapered elements, each element having at least one side inclined relative to a common surface at an angle sufficient to form a taper. The structured surface is preferably provided on the lens block by adhesively adhering a tape having the structured surface thereon to the housing of the lens block. A similar tape provides the structured surface for the lens blank.

The mechanical attachment means provides an attachment means which (1) does not require time for setting of an epoxy-type adhesive which slows the overall alteration process, (2) does not require cooling or heating time to afford a change of state of a metal alloy which slows the overall alteration process, (3) obviates damage to the lens blank from heat, (4) does not require expensive or complicated heating and cooling, alloy recovery and disposal equipment, (5) is free of an alloy which may contain hazardous materials, and (6) affords convenient, immediate attachment or release of a lens blank to or from a lens block, including multipositional attachment of the lens blank to the lens block.

The present invention may also be described as a method for altering a lens blank comprising the steps of (1) providing the lens blank, (2) providing the structured surface on the lens blank, including the tapered elements, (3) providing a lens block comprising a housing having a mounting surface, and the preferred lens block structured surface, including the tapered elements, (4) pressing the structured surface of the lens blank against the structured surface of the lens block to releasably attach the lens blank to the lens block, such that the inclined sides of lens blank's tapered elements are frictionally adhered to the lens block's tapered elements, (5) machining the lens blank with the machining means, and (6) removing the machined lens blank from the lens block.

BRIEF DESCRIPTION OF THE DRAWING

The present invention will be further described with reference to the accompanying drawing wherein like reference numerals refer to like parts in the several views, and wherein.

DETAILED DESCRIPTION

Figure 2:
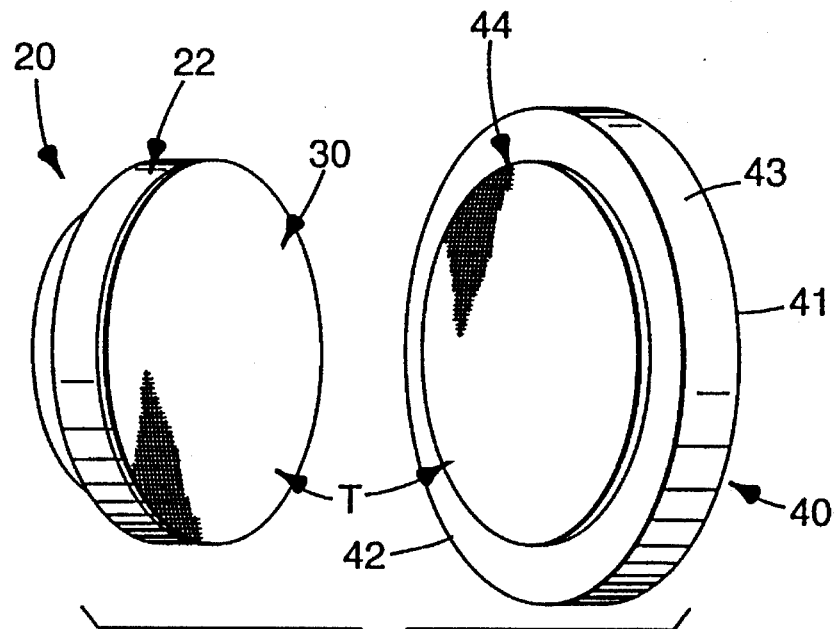
FIG. 2 is a perspective view of a lens block and a lens blank each having a structured surface according to the present invention.
Figure 3:
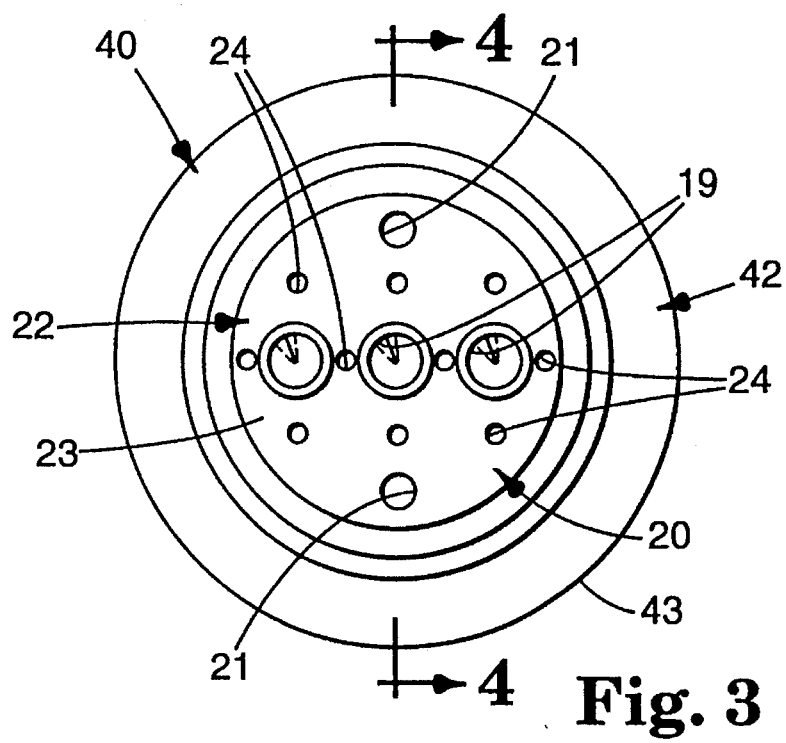
FIG. 3 is an enlarged back view of the block attached to the lens blank of FIG. 2.
Figure 4:
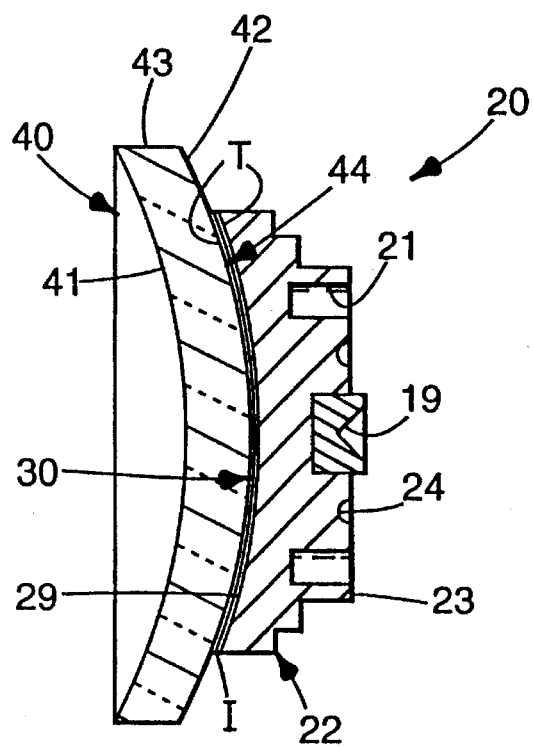
FIG. 4 is a sectional view of the lens block and blank of FIG. 3 taken approximately along lines 4—4 of FIG. 3.

Referring now to FIGS. 2 through 4 of the drawing, there is shown a lens block 20 and a lens blank 40 according to the present invention. The lens block 20 may be used in a method for processing the lens blank 40 that uses a processing means. As used herein, the phrase "processing means" is meant to encompass any operation that acts on the lens blank 40 such as, but not limited to, (1) machining means such as generators that generate a desired optical surface on the lens blank by grinding; polishers or finers which polish or fine the workpiece; or edgers for "edging" the lens blank so that it fits into the desired eyeglass framework, (2) testing means such as testers which test the optical properties (e.g. the optical power) of the lens blank, (3) treatment means for treating the lens blank such as chemical baths for coating the lens (e.g. to tint the lens) or chemical baths for coating the lens for other treatments, and (4) manipulation means for moving the lens blanks from one location to another, such as an automated system for transporting the lens from one location to another.

For example, the processing means may comprise the tools described in U.S. Pat. Nos. 3,732,647; 4,901,480; and 4,908,997 (the entire contents of each of which are herein incorporated by reference) or any suitable, well known generator, polishing, fining or edging tool such as the tools available from FB Optical of St. Cloud, Minn., CDP Diamond Products Inc. of Livonia, Mich., or Coburn Optical Industries Inc. of Muskogee, Okla.

The lens block 20 comprises a housing 22 having a first mounting surface 23 for releasably attaching the lens block 20 to the processing means. As shown in FIGS. 2 through 4, if the lens block comprises a lens "generator block", the mounting surface 23 may include three partially penetrating holes filled with steel inserts 19 and two additional sets of partially penetrating holes 21 and 24. For example, the mounting surface 23 affords mounting of the block 20 to a chuck of a lens generating device.

The inserts 19 are used in centering and angularly orienting the lens block 20 in a processing means such as the lens generator, and holes 21 and 24 provide offset positioning options required for some lens designs.

Figure 13:
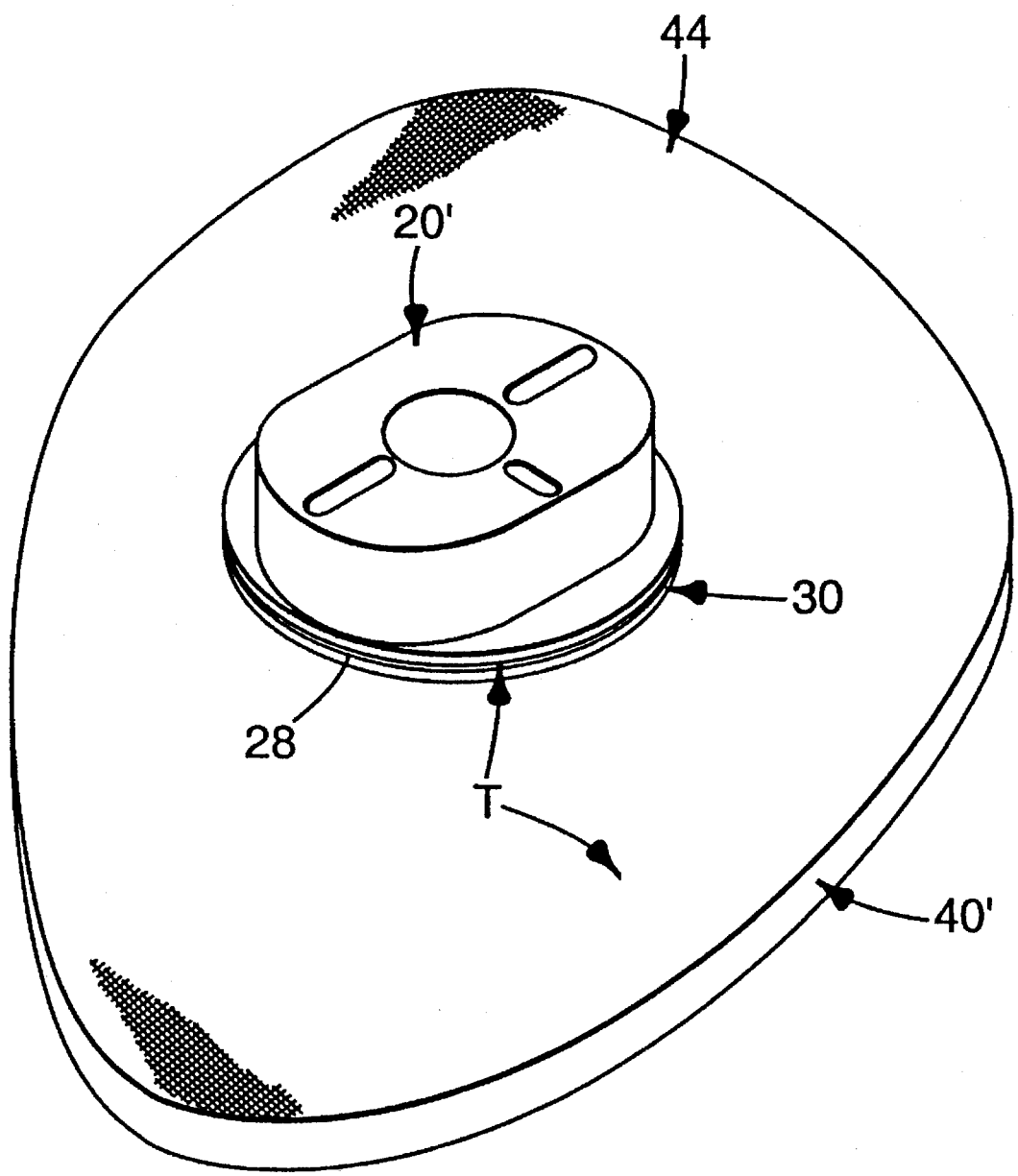
FIG. 13 is a perspective view of an edging block attached to a lens by using the attachment mechanism according to the present invention.

Alternatively, it should be noted that the lens block of the present invention may comprise any block used in conjunction with a processing means. For example, FIG. 13 illustrates a lens "edging" block 20' used to hold the lens blank 40' while the peripheral edge of the lens 40' is machined to the desired shape so that it may be placed in the desired frame.

The lens "generator" block 20 may be constructed from any suitable material such as a metal or plastic. Particular examples include aluminum or aluminum alloy, a cast iron or a powdered metal cast into the appropriate shape. Examples of plastic materials include polymeric materials, plexiglass, polyethylenes or polypropylenes.

When the lens block comprises a lens "generator" block, the housing 22 of the lens block 20 is preferably rotationally symmetric with sections of different diameters (FIG. 4). Preferably, the lens block 20 has a concave surface 29 having a predetermined base curve. The concave surface 29 is generally opposite the mounting surface 23. When a semi-finished lens blank having a nominal base curve is to be ground, the concave surface 29 preferably has a base curve which generally corresponds to the base curve of the lens blank. Alternatively, for some applications, the surface 29 may be a generally flat or planar surface, or a combination of flat and arcuate surfaces, or a stepped surface for providing a multifocal lens.

The lens block 20 also includes a structured surface 30 for releasably attaching the lens blank 40 to the lens block 20. As used herein, the phrase "structured surface" means any suitable surface which releasably attaches a lens blank to a lens block during alteration of the lens, such as during grinding of the unfinished side of a semi-finished lens blank.

While structured surfaces on either the lens blank or the lens block are contemplated within the scope of the present invention, structured surfaces on both the lens blank and the lens block provide a "mechanical attachment means" for releasably attaching a lens block assembly to a lens blank assembly. As used herein, the phrase "mechanical attachment means" is directed to an attachment mechanism that (1) is free of adhesives, waxes or alloys which require setting or heating or cooling time which slows the process for altering the lens, and (2) which is also free of an adhesive at an interface I of the lens block and lens blank, such as is present with a LEAP PAD (which is coated on each side with an adhesive) from the LEAP (Lens Edging Adhesive Pad) T.M. system generally available from Minnesota Mining and Manufacturing Co. (3M) of St. Paul, Minn. and as generally described in U.S. Pat. No. 3,962,833 and Reissue certificate No. 31,897.

The structured surfaces should provide a bond which is strong enough to withstand the forces encountered during processing operations, and yet affords easy removal of the lens blank from the lens block. For example, the structured surfaces should provide a bond which does not slip, slide, creep, rotate or separate during machining operations such as lens edging, fining, polishing or generating. Additionally, the bond should be resistant to the liquids used to cool the lens and processing means (e.g. lens generator) during alteration of the lens blank.

Figure 5:
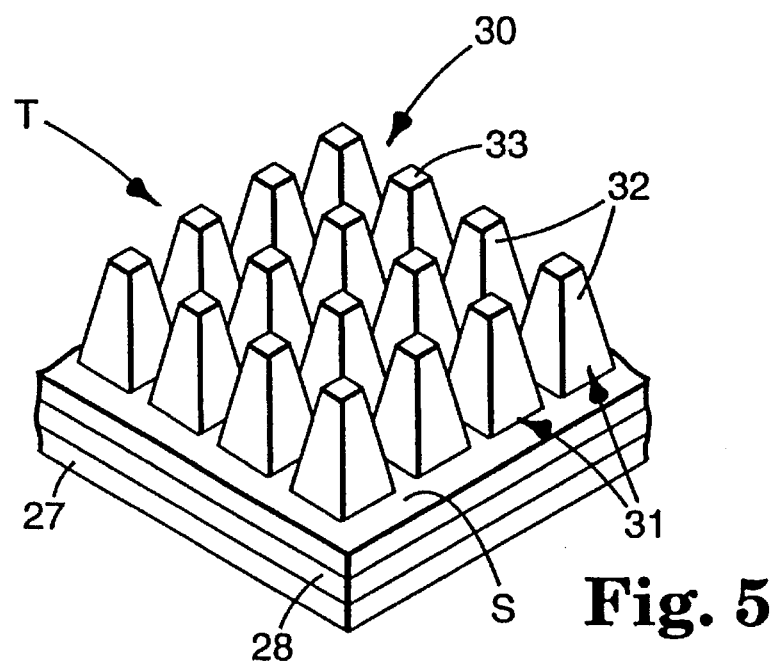
FIG. 5 is an enlarged perspective view of a tape which may be used to construct the structured surface shown in FIGS. 2 through 4.
Figure 6:
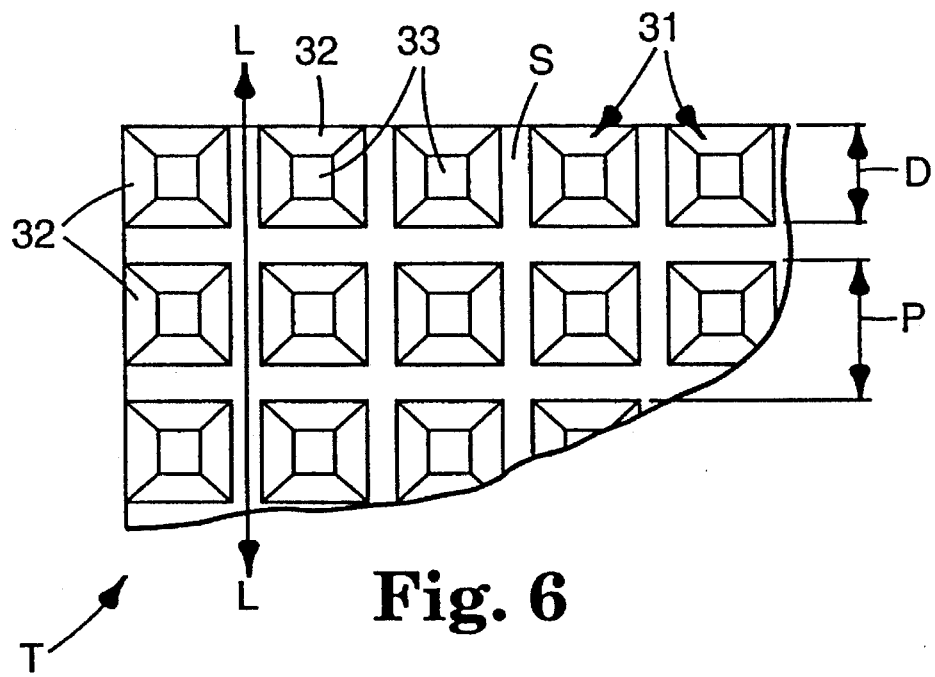
FIG. 6 is a plan view of an embodiment of frusto-pyramidal-shaped tapered elements of the structured surface according to the present invention which may be found on the tape of FIG. 5.
Figure 7:
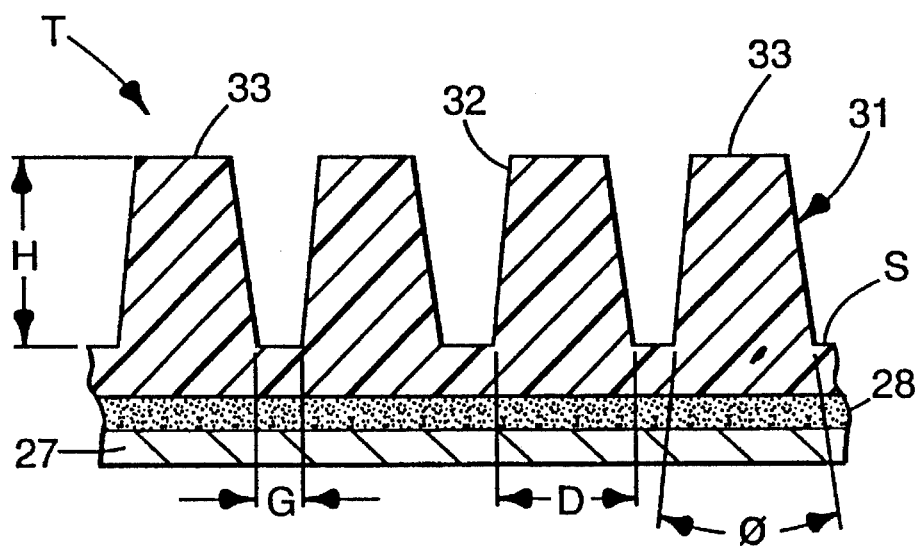
FIG. 7 is an enlarged sectional view of the tape of FIG. 5, with parts broken away to illustrate details of the geometry of the structured surface.

FIGS. 5, 6 and 7 illustrate a preferred embodiment of a structured surface 30 according to the present invention. The structured surface 30 may be provided by the intermeshable articles described in U.S. Pat. No. 4,875,259 to Appeldorn and U.S. Pat. No. 5,201,101 of which the entire contents of both documents are herein expressly incorporated by reference.

Preferably, the structured surface 30 is provided by an initially generally planar flexible tape T comprising a plurality of tapered elements 31 on one side and an adhesive layer 28 on the side opposite the tapered elements 31.

A removable protective backing 27 is provided to prevent the tape T from adhering to surfaces prior to its use and is easily removed from the tape T. The backing 27 may comprise a variety of materials such as a paper treated with a release agent such as silicone, or alternately a conformable (e.g. one that can be formed to the shape of a surface) material, such as polyethylene, or polyvinyl chloride, etc.

The adhesive side of the flexible tape 30 is pressed against the concave surface 29 of the lens block 20 to provide a lens block assembly. The flexible tape T generally conforms to the shape of the concave surface 29. Each of the tapered elements 31 have at least one side 32 inclined relative to a common surface S at an angle sufficient to form a taper. The tapered elements 31 are preferably arranged to form a plurality of axes including at least one longitudinal axis L.

Alternatively, the structured surface 30 need not be provided by a tape. Instead, for example, the lens block housing 22 and structured surface 30 may be an integral monolithic structure. As used herein, the phrase "integral monolithic" means that the housing of the lens block and the structured surface may comprise a one-piece structure without requiring the extra step of attaching a structured surface to the housing 22. For example, the housing and structured surface may be constructed at the same time using an injection molding process or a casting process. Thus, as used herein, the phrase "lens block" is meant to encompass structures that are either (1) integral, monolithic structures, or (2) structures (assemblies) which result from the combination of several elements such as the tape T and the housing 22 mentioned above.

The lens blank 40 according to the present invention comprises generally opposite first 41 and second 42 major side surfaces and a peripheral edge surface 43 between the first and second surfaces 41 and 42. The lens blank 40 may comprise any suitable lens such as, spherical, cylindrical, optical flats, aspherical, multifocal or other lenses. For example, if the lens blank 40 comprises a semi-finished lens blank, the first side surface 41 (shown in FIG. 2) is a generally concave unfinished surface (e.g. one that is adapted to be ground and polished during the alteration process), and the second side surface 42 is a generally convex, finished surface (e.g. that is cast to a predetermined nominal base curvature).

The lens blank 40 may be a single or multi-focal lens or other optical element. It may be constructed from a variety of materials, such as, but not limited to glass or plastic. The first and second surfaces 41 and 42 may be convex, concave, cylindrical or flat. Furthermore, the second surfaces 42 may contain adds so that multifocal lenses can be produced. For example, the lens blank may comprise an ARMORLITE, Hard Resin Semi-Finished Blank, Single Vision, SPH 70, generally available from Signet Armorlite, Inc. of San Marcos, Calif. having a nominal base curve of 4.5.

One of the first or second side surfaces 41 or 42 comprises a structured surface 44 (in FIG. 2 the structured surface is on the second major side surface 42) for releasably attaching the lens blank 40 to the lens block 20. When the phrase "structured surface" is used in conjunction with the lens blank, it means any suitable surface which releasably attaches a lens blank to a lens block during alteration of the lens, such as during grinding of the unfinished side of a semi-finished lens blank.

The structured surface 44 may be identical to the structured surface 30. The structured surface may also be provided by a tape T similar to the tape described above in conjunction with the lens block 20 to provide a lens blank assembly and shown in FIGS. 5, 6 and 7. However, the structured surface 44 need not be used in conjunction with the structured surface 30. Instead, the structured surface 44 may also be used in conjunction with the alloy blocking systems of the prior art. For example, the structured surface may comprise a roughened surface which afford enhanced "deblocking" of the lens blank from the alloy lens block of the prior art.

Optionally, a strip of protective tape (not shown) may be placed between the lens blank 40 and the tape T (e.g. on convex side 42) which provides the structured surface 30. For example, the tape described in U.S. Pat. No. 4,287,013 (the entire contents of which are herein incorporated by reference) or Surface Saver T.M. tape (generally available from the Minnesota, Mining and Manufacturing Co., 3M, of St. Paul, Minn.) may be used to provide the protective tape. The protective tape protects the surface of the lens blank 40 from damage such as scratches, scrapes or chipping.

Alternatively, like the structured surface 30, the structured surface 44 need not be provided by a tape. Instead, for example, the structured surface 44 and the second major side surface 42 may comprise an integral monolithic structure. Again, as used herein, the phrase "integral monolithic" means that the second major side surface 42 of the lens blank 40 and the structured surface 44 may comprise a one-piece structure without requiring the extra step of attaching a structured surface to the lens blank 40. For example, the structured surface and lens blank may be cast or molded at the same time with the structured surface on the first or second major side surface or on the peripheral surface of the lens blank.

As used herein, the phrase "lens blank" is meant to encompass structures that are either (1) integral, monolithic structures, or (2) structures which result from the combination of several elements (lens blank assemblies) such as (a) the tape T and the lens blank 40, or (b) the tape T, protective tape and lens blank 40.

When the preferred structured surfaces 30 and 44 of the lens block and lens blank are brought together they adhere to one another, since the inclined sides of the lens block's tapered elements frictionally adhere to the inclined sides of the lens blank's tapered elements, generally at the interface I between the lens blank and lens block. It is believed that the lens block and lens blank may be attached to one another without first aligning the structured surfaces, affording random, multipositional alignment of the block and blank. The multipositionable feature of the lens block and blank afford convenient, efficient marking and attachment of the lens block to the lens blank.

The structured surfaces 30 and 44 of the lens block and blank generally comprise solid pyramidal-shaped elements having a polygonal-shaped cross-section. The phrase "pyramidal-shaped elements" is used herein to include truncated versions such as the frusto-pyramidal-shaped elements shown in FIG. 5. The pyramidal-shaped elements generally include a polygonal-shaped cross-section such as the square shown in FIG. 5. Alternatively, the cross-section may be rectangular, regular hexagonal, hexagonal, triangular, circular, elliptical, combinations thereof, or combinations of straight and arcuate line segments.

The particular material used to construct the structured surfaces 30 and 44 of the tape T may be any suitable material so long as the inclined sides of the lens block's tapered elements frictionally adhere to the inclined sides of the lens blank's tapered elements. Preferably, at least one of the materials affords a flexible tapered element that may axially bend and torsionally twist or flex. Various materials may be used such as but not limited to commercially available acrylics, vinyls, polymers (including electron beam or radiation cured polymers), polyethylene, polypropylene (e.g. Exxon corporation's 3505 G polypropylene), polybutylene (e.g. Shell Corporation's #8510 polybutylene), polycarbonates, and mixtures thereof (such as a 50/50 mixture of polypropylene and polybutylene). Particular examples include polymethyl methacrylate, polystyrene, non-rigid polyvinyl chloride with plasticizers, and biaxially-oriented polyethylene terephthalate. Additionally, the material may be biodegradable, transparent or translucent according to the particular application. Additionally, any of the materials mentioned in U.S. Pat. No. 4,875,259 may be used.

The adhesive 28 used in conjunction with the lens block 20 or lens blank 40 should afford easy removal of the backing 27, yet provide firm bond between the tape T and the (1) lens blank or protective tape (such as Surface Saver T.M. tape), or (2) the lens block housing 22. Additionally, the bond should be resistant to the liquids used to cool the lens and processing means (e.g. lens generator or edger) during alteration of the lens blank. For example, it is believed that the adhesives described in U.S. Pat. No. Re. 24,906 (which optionally may contain a tackifier such as Foral) would be appropriate adhesives for the adhesive 28. Also, it is believed that the adhesive used on LEAP T.M. pads, generally available from Minnesota Mining and Manufacturing Co. (3M) of St. Paul, Minn. would be an appropriate adhesive. Additionally, the adhesives described in U.S. Pat. No. 31,897 are believed to be appropriate adhesives for the adhesive 28.

Figure 8:
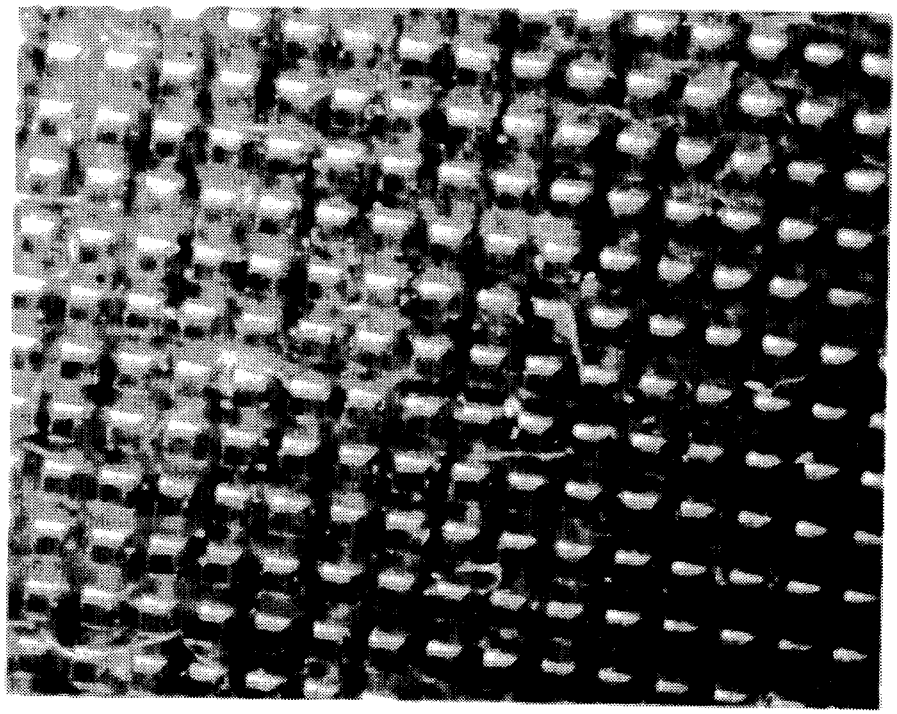
FIG. 8 is a photomicrograph taken through a microscope at a first magnification illustrating the structured surface of the tape of FIGS. 5 through 7 after it has been adhesively adhered to the concave surface of a lens generator block.
Figure 9:
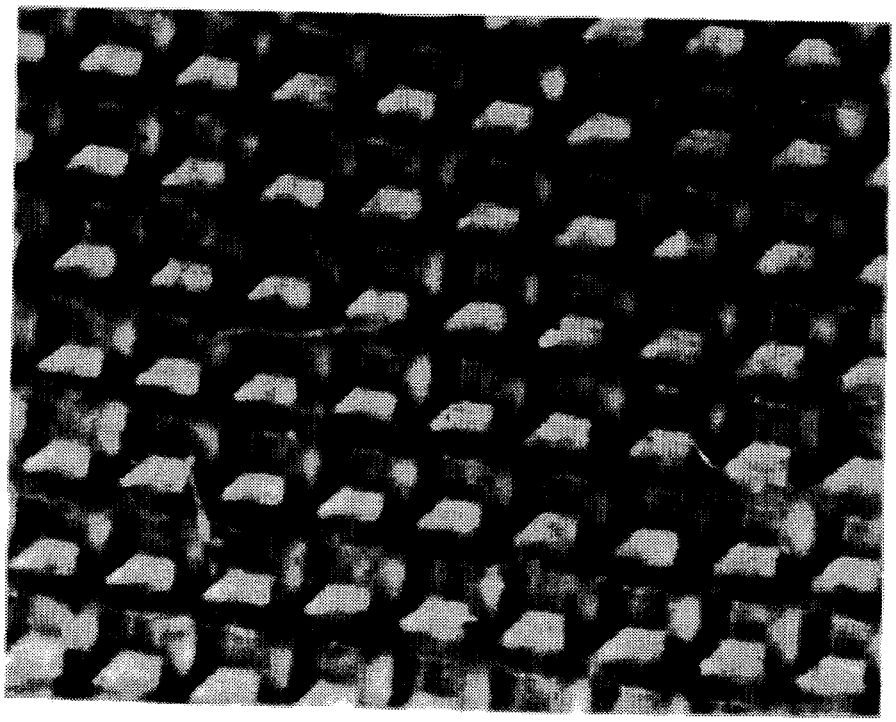
FIG. 9 is a photomicrograph taken through a microscope at a second magnification which is greater than the magnification of FIG. 8 which illustrates the structured surface of the tape of FIG. 8.
Figure 12:
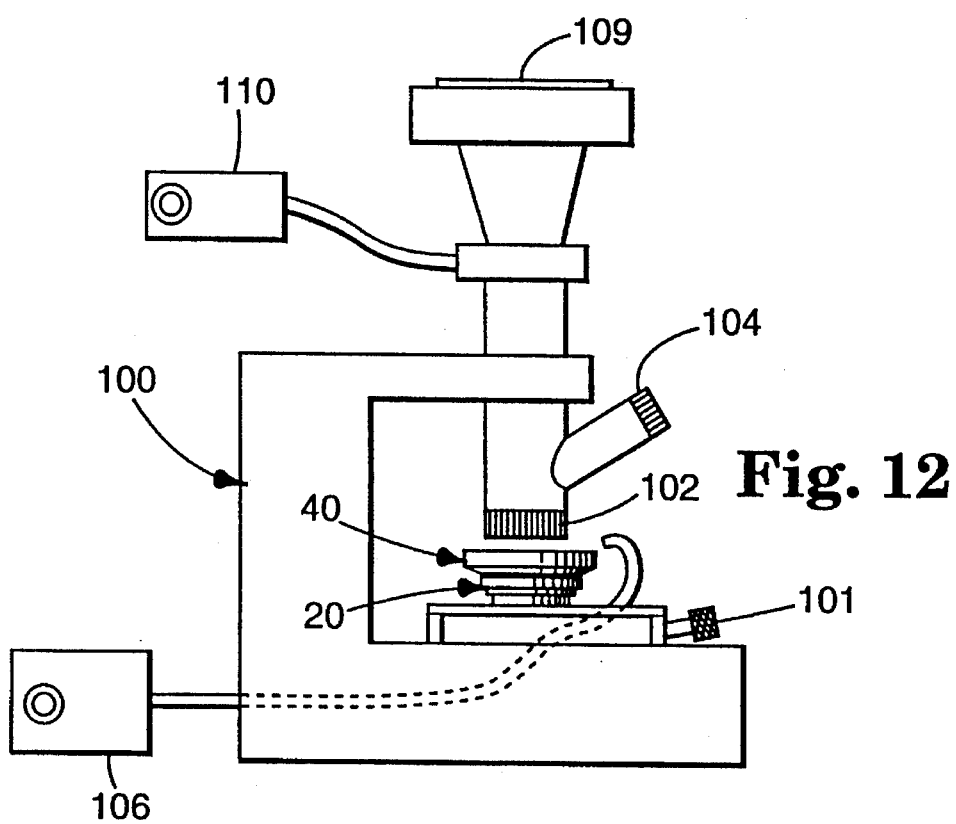
FIG. 12 is a schematic illustration showing equipment which may be used to take photomicrographs similar to FIGS. 8 and 9.

FIGS. 8 and 9 are photomicrographs of the tape T described in Example 1 infra after it has been adhered to the concave surface of a lens generator block. The photograph illustrates a microstructured surface comprised of the flexible tapered elements. FIG. 12 illustrates an example of equipment that may be used to take photomicrographs similar to those shown in FIGS. 8 and 9.

Clear or transparent tape T was provided such as described in Example 1 infra. The generator block housing and the tape T were attached to one another by the following steps: (1) The tape T and a lens generator block having a concave surface were provided. (2) The backing of the tape T was removed and the tape T and the concave surface of the generator block were pressed together with moderate finger pressure. The tape T was also manually pressed onto the lens blank. (3) The resultant combination of elements in step 2 was then placed on the tray of a Leitz Optical Microscope 100 (e.g. the Leitz Optical Microscope, generally available from Leitz of Wetzlar, Germany or Technical Instruments Co. of San Francisco, Calif.).

An X Y theta stage Boeckeler Digital micrometer (reference character 101) model 1398 generally available from TKL Inc., of Newport Beach, Calif. may provided so that a user can manipulate the position of the lens generator block and structured surface relative to the microscope 100. A magnification objective 102 and a magnification eyepiece 104 generally available from Leitz of Wetzlar, Germany or Technical Instruments Co. of San Francisco, Calif. may be used to take photomicrographs similar to those shown in FIGS. 8 and 9.

The microscope 100 was focused onto the top of the structured surface of the tape T. The sample was illuminated from the top as shown in FIG. 12 by means of a suitable light source such as an Intralux 5000 120 volt, 180 watt light supply 106, generally available from the Volpi Manufacturing Company, Inc. of Auburn, N.Y.

A camera 109 was provided. For example, a WILD camera 109 generally available from WILD of Heerbrugg, Switzerland could be used to take the photomicrograph. The camera 109 is loaded with film such as Polaroid high speed black and white 667 film. An exposure device 110 is provided such as a Wild photomat MSP 45 generally available from WILD of Heerbrugg, Switzerland. The Wild photoautomat MPS 45 (reference character 110) controlled the exposure of the camera 109.

It should be noted that the tapered elements of one tape T (e.g. the tape on the lens block) may be positive elements (e.g. solid elements which project from their respective common surfaces) and the elements of the other tape T (e.g. the tape on the lens blank) may be negative elements (e.g. cavities which are recessed from their respective common surface) so that the sides of the positive elements may engage with the sides of the negative elements to adhere thereto. Additionally, it should be appreciated that the cross-sectional shape of the tapered elements of the first tape may be dissimilar to the cross-sectional shape of the tapered elements of the second tape. For example, positive, hexagonal shaped tapered elements may engage with appropriately arranged negative, triangular shaped elements.

EXAMPLE 1

Referring to FIGS. 5, 6 and 7, there is shown a preferred embodiment of tape T used to form the structured surfaces 30 or 44. The tape has a microstructured surface.

The tapered elements 31 include top surfaces or portions 33 which define a height H measured from the common surface S. It should be noted that, initially, the tape T provides a common surface S that is relatively flat and planar. However, once the flexible tape is placed on a concave, convex, arcuate or otherwise irregular surface, the common surface S tends to conform to generally the shape of the concave, convex, arcuate or otherwise irregular surface.

The tape in this example initially comprised a strip of PVC film with plasticizers. The tape T was flexible and had integral, uniform flexible elements 31. 2¼ and 3 inch discs were stamped (cut) from flat portions of the tape T. The tape had a total thickness of about 1.0–1.27 millimeters (40–50 mils). A Medical Transfer Adhesive on Liner, product #1524 transfer adhesive (commercially available from The Medical Specialties Department of Minnesota Mining and Manufacturing Co. (3M), of St. Paul, Minn.) was applied to the flat surface of the tape T by using a 5 pound roller. However, it is believed that virtually any similar adhesive would suffice. For example, it is believed that a 94% isooctyl acrylate (IOA) 6% acrylic acid AA with a Foral 85 tactifier would be an appropriate adhesive.

The tape T comprised polyvinyl chloride constructed from clear #516 PVC pellets obtained from Alpha Chemical and Plastics Corporation 9635 Industrial Drive, Pineville, N.C. (manufacturer no. 2215-80; RM #11-0003-9105-9).

Referring now to FIGS. 6 and 7, the structured surface 30 had about a 0.63 millimeter or 25 mil groove depth or height H, a 9 degree 36 minute (rounded to 10°) included angle between tapered surfaces 32 (shown as the angle phi in FIG. 7), a pitch or lattice constant of about 0.33 millimeters, (13.08 mils) (shown as P in FIG. 6), top dimensions of approximately 0.12 by 0.12 mm. (4.86 by 4.86 mils) (e.g. the length of the sides of the top surfaces 33), and a width at the base of grooves of about 0.23 millimeters, (9.06 mils) (shown in FIG. 6 as the Diameter D). The distance G shown in FIG. 7 is simply P-D or 0.10 millimeters.

When polyvinyl chloride made from clear #516 PVC pellets obtained from Alpha Chemical and Plastics Corporation 9635 Industrial Drive, Pineville, N.C. (manufacturer no. 2215-80) was used, it is believed that the flexible elements with the above mentioned dimensions twisted and bent sufficiently to enable the lens blank and block to be fastened in a plurality of angular orientations enabling the lens block to be attached to the lens blank in a multipositional manner. This is believed to afford convenient mounting of the lens blank to the lens block.

Generally, the material characteristics, the cross sectional shape of the elements 31 (e.g. square or rectangular etc.), the angle between tapered surfaces (e.g. the angle phi), the height H to diameter D ratio H/D and the pitch P to diameter D ratio P/D are all believed to affect the ability of the tapered elements to bend and twist.

All other factors held constant, preferably the height H to diameter D ratio should be sufficient to afford bending and twisting of the elements 31. In example 1, the height to diameter ratio H/D was (0.63 millimeters/0.23 millimeters)= 2.74. This H/D ratio for this material was found to work well and to provide for attachment at different angular orientations. All other factors held constant, the H/D ratio should be numerically large enough to afford flexing and twisting of the element 31.

Additionally, all other factors held constant, the pitch P to diameter D ratio P/D should be sufficient to afford bending and twisting of the tapered elements. For example, in example 1, the P/D ratio is 0.33/0.23=1.43. This P/D ratio for this example was found to work well and to provide for attachment at different angular orientations. All other factors held constant, the P/D ratio should be numerically large enough to afford flexing and twisting of the tapered element.

The tape T described in this example was constructed in the following manner. First, a Pasadena Hydraulics, Inc., 50 Ton Model Compression Molding Press (generally available from Pasadena Hydraulics, Inc. of Pasadena, Calif.) was used. The molding surfaces were constructed to provide a tape having the dimensions set forth above. The PVC material described above was used.

The molding surfaces were first constructed having the dimensions and shape set forth in Example 1. Any suitable acrylic plastic material may be used to provide a molding sample. Diamond turning equipment such as the Moore Special Tool Co. Model M-40 generally available from the Moore Special Tool Co. of Bridgeport, Conn. or the Pneumo Co. Model SS-156 (e.g. SN 76936) generally available from PneumoPrecision, Inc. of Keene, N.H. may also be used to construct the molding sample.

Of course, it will be appreciated by those skilled in the art that the tapes of the present invention are not necessarily only individually machined but are instead produced by a microreplication process. Thus, to construct the molding surfaces, the molding sample mentioned above was used in a conventional electroforming process (similar to the electroforming process mentioned in U.S. Pat. No. 4,871,623 the entire contents of which are herein expressly incorporated by reference) to provide the suitable molding surface. For example, a nickel molding surface may be electroformed from the acrylic plastic sample mentioned above.

Once the molding surfaces were constructed, the PVC pellets were then initially placed between the two molding surfaces of the Compression Molding Press. The molding surfaces of the press were heated to 350 degrees fahrenheit, after which a force of about 4350 pounds per square inch was exerted on the molding surfaces for a time period of two minutes. After two minutes, the force was increased to 45,000 pounds per square inch for a time period of two minutes.

The molding surfaces were then cooled to 100 degrees fahrenheit while a force of 45,000 pounds per square inch was maintained for a time period of ten minutes. After the ten minute time period, the 45,000 pounds per square inch force was removed. The PVC article was then removed from the molding surfaces.

There are several other methods which may be used to produce the tape T according to the present invention which are known in the art, such as the methods disclosed in U.S. Pat. Nos. 3,689,346 and 4,244,683 to Rowland; 4,875,259 to Appeldorn; 4,576,850 to Martens; and U.K. Patent Application No. GB 2,127,344 A to Pricone et al. the entire contents of which are herein expressly incorporated by reference.

After the tape T was constructed, a semi-finished CR-39 lens blank 40 was obtained from Signet/Armorlite with a front surface cast to the intended, predetermined base curve. Prior to placing the tape T on the lens blank 40 a center axis line was drawn on the convex side of the lens surface for use in aligning the lens.

Figure 10:
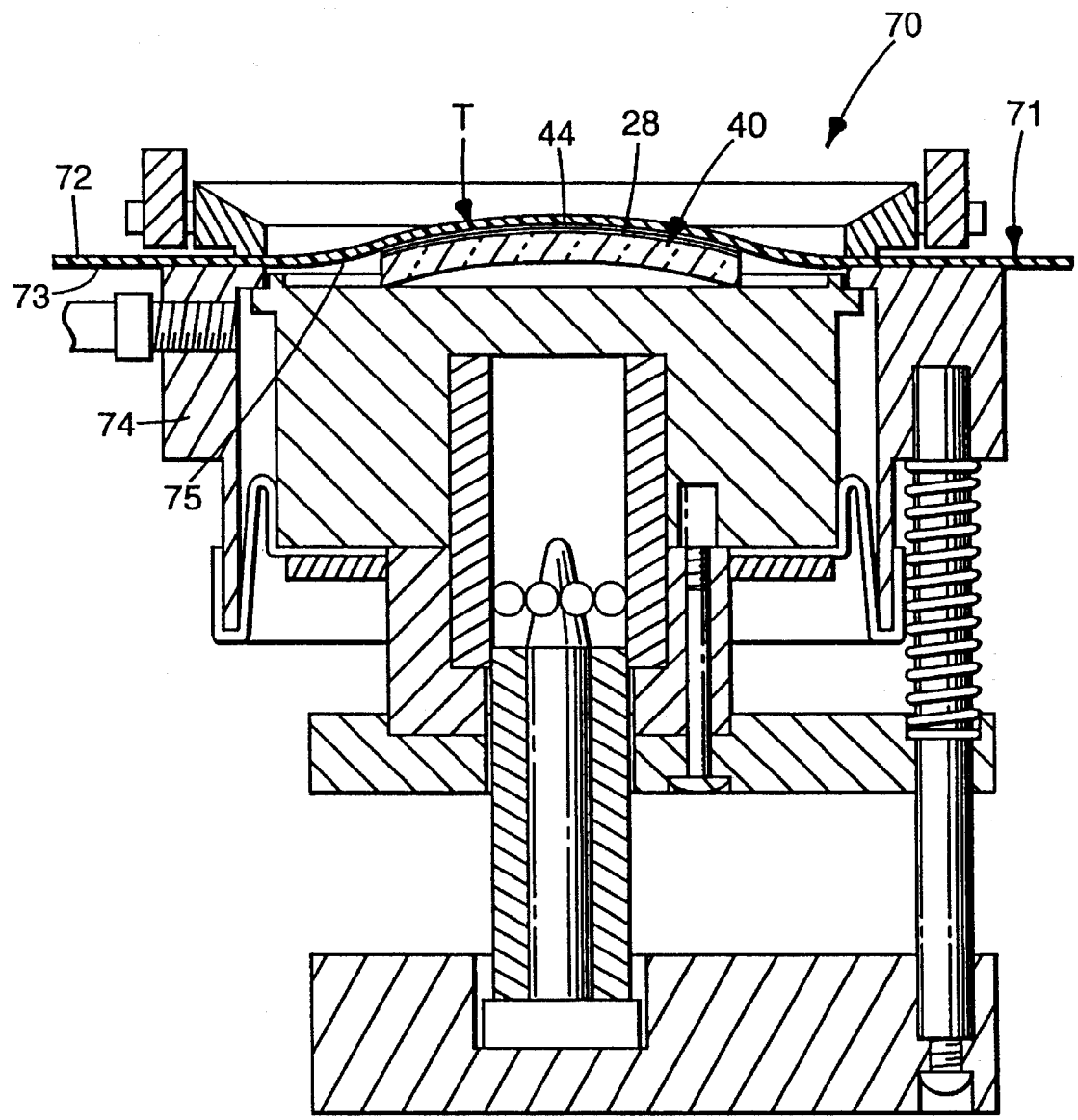
FIG. 10 is a sectional view of a slightly modified Surface Saver T.M. Applicator (generally available from the Minnesota Mining and Manufacturing Co., 3M, of St. Paul, Minn.) which is generally described in U.S. Pat. No. 4,242, 162 and a lens blank/structured surface according to the present invention illustrating how the Surface Saver T.M. Applicator may be used to apply the tape of FIG. 5 to a lens blank.

FIG. 10 illustrates a slightly modified 3M SURFACE SAVER Applicator Model 1645, generally described in commonly assigned U.S. Pat. No. 4,242,162, Ronning et al, and generally shown as reference character 70. In this example, the Applicator 70 was slightly modified in the following manner: A length of Surface Saver T.M. tape 71 (generally available from Minnesota Mining and Manufacturing Co., 3M) was provided. The Surface Saver tape has a first side 72 coated with an adhesive, and a second side 73 free of adhesive. The Surface tape 71 was placed "upside down" (relative to its normal use on the applicator 70) and adhered to a cover 74 of the applicator 70. The tape 71 adhered to the cover 74 so that a vacuum may be produced in chamber 75 of applicator 70.

The adhesive side of the 3 inch disc of the tape T was manually pressed against the finished surface of a semi-finished lens blank. The semi-finished lens blank 40 was then inserted in the 3M SURFACE SAVER Applicator Model 1645, generally described in commonly assigned U.S. Pat. No. 4,242,162, Ronning et al.

A partial vacuum was then used to bring the pressure-sensitive-adhesive 28 into non-shearing contact with the finished lens surface, and establish a suitable adhesive bond.

An aluminum generator block was then provided having a predetermined arcuate surface (base curve). The generator block was similar to the generator block shown in FIG. 3 and 4. The 2¼ inch discs were then manually pressed against the concave surface of the lens block.

The lens block and lens blank were then manually aligned. A line formed by metal inserts 19 is positioned relative to the center axis line drawn on the lens surface. By visually aligning these lines, the centerline formed by inserts 19 is manually positioned/attached over the center axis line on the lens. After alignment the lens blank and block were pressed together.

The generator block and blank assembly was then attached to the generator block clamping mechanism (i.e. chuck) of a Coburn Model 108 generator (from Coburn Optical Industries, Muskogee, Okla.). The unfinished major side surface of the lens blank was positioned adjacent a plated diamond grinding "wheel", wherein the "wheel" is in the form of a substantially hemispherical shell with diamond cutting elements attached to the edges.

A drive shaft member is permanently attached to the exterior surface of the hemispherical shell and positioned such that the axis of symmetry of the hemispherical shell coincides with the drive shaft axis. During the lens generating operation, the rapidly rotating drive shaft is also moving in an oscillatory manner about a second axis which is perpendicular to the drive shaft axis. The latter movement creates a trajectory of the grinding edges of the diamond wheel which creates a concave back surface on the lens blank.

The generator block assembly, with the partially finished lens blank attached, was then removed from the block clamping mechanism of the Coburn Model 108 generator and installed in a Coburn Model 506 cylinder machine for "fining" and polishing of the lens blank. The "fine" process includes two stages which continue to create the desired lens power by further refining the rough ground concave back surface produced by the generator, and prepares the back surface for polishing. The first fine stage was performed using a 3M QWIK STRIP PAPER PAD, generally available from Minnesota Mining and Manufacturing Co. 3M of St. Paul, Minn. which is uniformly coated with 15 micrometer diameter silicon carbide particles to remove a layer from the second surface of about 0.4 to 0.5 mm. thickness.

The QWIK STRIP PAD was mounted to a lap, cut to the curvature of the corresponding desired diopter powers-in this example: a 6.25 base curve with an 8.25 cylinder curve. The second fine stage was performed using a 3M QWIK STRIP FINING PAD with resin beads containing 4 to 15 micrometer diameter aluminum oxide particles, uniformly dispersed over a film backing, to remove a layer from the second surface of about 0.05 mm. thickness and provide a pre-polish finish.

The polishing step was performed using a 3M POLISHING PAD, generally available from Minnesota Mining and Manufacturing Co. 3M of St. Paul, Minn. and a Micronal No. 707 liquid polishing solution, generally available from Semi-Tech Inc. of Garland, Tex. All of the aforementioned pads are in the rough form of a "daisy", and have a back-side coating of pressure sensitive adhesive for attachment.

The lens generator block assembly, with the finished lens blank assembly attached, was then removed from the Coburn Model 506 cylinder machine and a deblocking procedure was used to remove the structured-surface of the tape T, attached to the finished lens, from the corresponding intermeshed structured surface of the generator block assembly.

Figure 11:
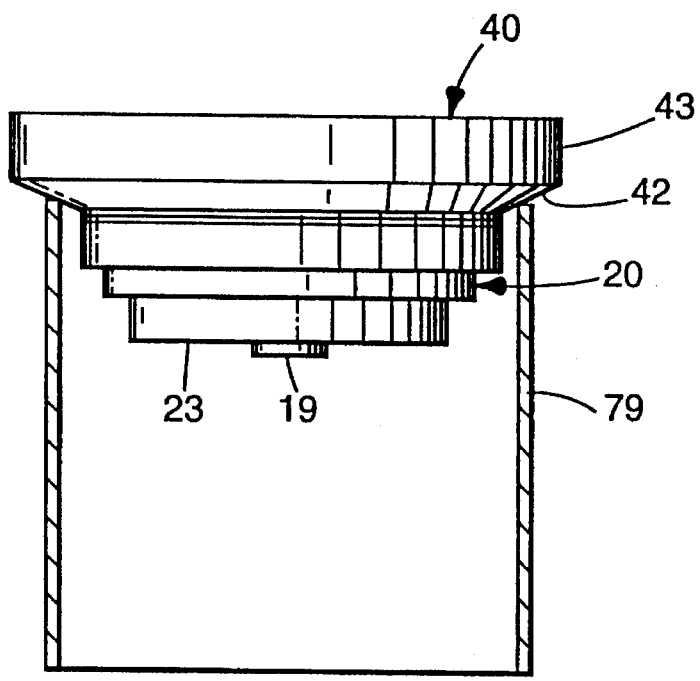
FIG. 11 is a side view of an apparatus that may be used to separate the lens blank/structured surface from the lens block/structured surface illustrating the lens blank and block at the top of the apparatus.

FIG. 11 illustrates how the lens blank 40 was removed from the lens block 20 after the blank was machined. For deblocking, the generating block assembly was inserted into the 6.35 cm aperture of a deblocking device 79, consisting of a 7 cm length of PVC pipe (6.35 cm I.D. with 5 mm wall thickness). An impulsive force, resulting from striking the opposite end of the deblocking device on the benchtop, separated the lens assembly from the generating block assembly.

The structured surface is relatively rough as compared to the relatively smooth surface of a protective tape such as Surface Saver tape mentioned above. The preferred structured surface provides a rough surface that is believed to provide a bond that rigidly holds the lens block to the blank during machining operations and yet readily releases the blank from the block during a deblocking procedure. Additionally, it is believed that by controlling the shape of the structured surface on the lens blank, the force required to remove the block may be affected. Thus, providing a structured surface on the lens blank is believed to afford desired release (deblocking) characteristics from, for example, a lens block which uses an alloy-type attachment means.

Note that the tape T could also be used to provide attachment during the final edging process. However, because the normal processing procedure requires unimpeded access to both surfaces of the finished lens so it can be tested for lens power, defects, etc., the tape T was peeled away from the first surface of the lens after the lens assembly was deblocked.

The above description illustrates that the mechanical attachment means of the present invention functions for generator blocks which have generally the same radius of curvature as the radius of curvature of the finished side of a semi-finished lens.

Next, a test was run to determine whether a lens block having a concave surface having a first radius of curvature will function with lens blanks with differing radius of curvatures.

First, Armorlite, Hard Resin Semi-Finished lens blanks generally available from Signet Armorlite, Inc. of San Marcos, Calif. with manufacturer rated nominal base curves of 1.5, 4.5, 6.25 and 10 and having a thicknesses of approximately 10 mm were provided.

Next, lens blocks with 2, 4, 6, 8 and 10 nominal base curves were provided. As used herein, when used to describe the curvature of the arcuate surface 29 of the lens block 20, the phrase "nominal base curve" means that curvature or shape of the concave surface 29 that corresponds to a similarly shaped lens blank (e.g. a lens blank having the same nominal base curve).

Nine different combinations of lens block nominal base curves and lens base curves were tested in this example. The results are summarized below in Table 1 under Test Results.

The force and time information in table 1 refers to the manner in which the lens block and blank were mounted for this test. The tape T described in example 1 was used and was placed on the lens blank and block. Lens blanks and blocks having their respective listed base curves were chosen.

A lens block was placed on top of a common scale and the structured surface of the lens block was placed against the structured surface of the lens blank. Manual pressure listed under the column "Force" (in pounds force) was exerted for the duration listed under the column "Time" in table 1.

The generator block and blank assembly was then attached to the generator block clamping mechanism (i.e. chuck) of a Coburn Model 108 generator (from Coburn Optical Industries, Muskogee, Okla.). The test was a pass/fail test. Failure was defined as any undue slipping, sliding, creeping, rotation or separation of the lens blank and block witnessed during or after the generating operation. Failure was determined by visual inspection.

In combinations I, II, III and V of Table 1, five (5) one millimeter cuts were made in the lens blank concluding in "Pass" results. In combination VII, because of the differing base curves of the lens blank and block, the tapered elements of the lens block contacted the tapered elements of the lens blank in an approximately ⅛ inch to 3/16 inch ring generally at the outer periphery of the lens block. Five (5) one millimeter cuts were made in this lens blank concluding in a "Pass" result.

In combination IV, four (4) one millimeter cuts were made, but on the fifth, one millimeter cut the combination failed by separation. Combination VI failed prior to any generating in that there was no support for the lens blank. Combination VIII failed by separation during the first pass. However, it is believed that this failure is at least partially due to the short duration of force applied (10 seconds as as compared to 15 seconds), and the relatively low force (20 lbf. as compared to 40 lbf.).

Combination IX used a very irregular shaped lens commonly known as a post-cataract (lenticular) lens having a one-half (½") inch center area having approximately an 18 base curve middle surface and a ⅛ to ⅜ inch generally flat peripheral ring. Combination IX failed by separation prior to generating. This failure was expected due to the highly irregular shape of the lens blank. However, it is believed that a custom made lens block could be constructed for this type of lens blank.

TEST RESULTS

Referring now to Table 1 there is shown the test results for lens blocks and lens blanks having different base curves.

TABLE 1

| Grinding Block (Base Curve) | Lens Armorlite (Nominal Base Curve) | Force | Time | Results |
| --- | --- | --- | --- | --- |
| I. 2 | 1.5 | 40 lb f | 15 seconds | Pass |
| II. 6 | 6.25 | 40 lb f | 15 sec | Pass |
| III. 10 | 10 | 40 lb f | 15 sec | Pass |
| IV. 4.5 | 6.25 | 40 lb f | 15 sec | cut 4, 1 mm cuts, the fifth cut - lens fell off |

TABLE 1-continued

| Grinding Block (Base Curve) | Lens Armorlite (Nominal Base Curve) | Force | Time | Results |
|---|---|---|---|---|
| V. 6 | 4.5 | 40 lb f | 15 sec | Pass |
| VI. 4.5 | 8.25 | 40 lb f | 15 sec | no support, did not attempt |
| VII. 4.5 | 1.5 | 40 lb f | 15 sec | Pass |
| VIII. 8 | 8.25 | 20 lb f | 10 sec | failed first pass |
| IX. 10 | ½ inch center area + ⅛ to ⅜ inch ring | 80–90 lb f | 15–20 sec. | pulled apart before grinding lens |

Surprisingly, table 1 shows that a lens block having a base curve of 6 functioned with lens blanks with different base curves (e.g. 4.5 and 6.25). Thus, it is believed that the mechanical attachment means of the present invention provides a single lens block assembly having a fixed base curve (or radius of curvature) which may be used with several different lens blanks which have differing base curves.

Generally, for best results, it is believed that the base curve of the lens blank should be generally equal to the base curve of the lens block. However, if the base of the lens block is different than the base curve of the lens blank, then the base curve of the lens blank should be less than the base curve of the lens block. Preferably, the major contact area of the structured surfaces of the blank and block is nearer to the periphery of the lens block than to the middle of the lens block.

EXAMPLE 2

After the lens tests of Example 1 were completed, a new, smaller piece of structured surface tape T was attached to the first surface of the lens to permit attachment to a lens edging block. FIG. 13 illustrates a lens edging block attached to the lens. The lens edging block used was a slightly modified form of a LEAP BLOCK.

The tape T was adhered to both the lens block and blank. The tape T was applied over substantially all of the second surface of the lens. After marking the lens and block, the structured-surface of the tape T was then intermeshably fastened to the structured-surface of the edging block, and the edging block was then attached to the chuck of an AIT Mark V1 edger machine.

The lens was then cut to the shape required for installation in the selected spectacle frames with no failure of the structured surface. The edging block was then removed from the chuck and the structured-surface tape T was peeled from the finished lens, which was now ready for installation in the frames.

The modified edging block used in this example had a first concave surface similar to the first concave surface 29 of generating block 20 in FIGS. 3 and 4, and similarly had a layer of tape T with the structured surface as the exposed surface. The edging block had a smaller diameter of about 2.2 cm, however, and had a different chuck pattern on its second surface corresponding to that of 3M LEAPBLOCK (Finished Goods) No. 70 2004 1451 7.

METHOD

Figure 14:
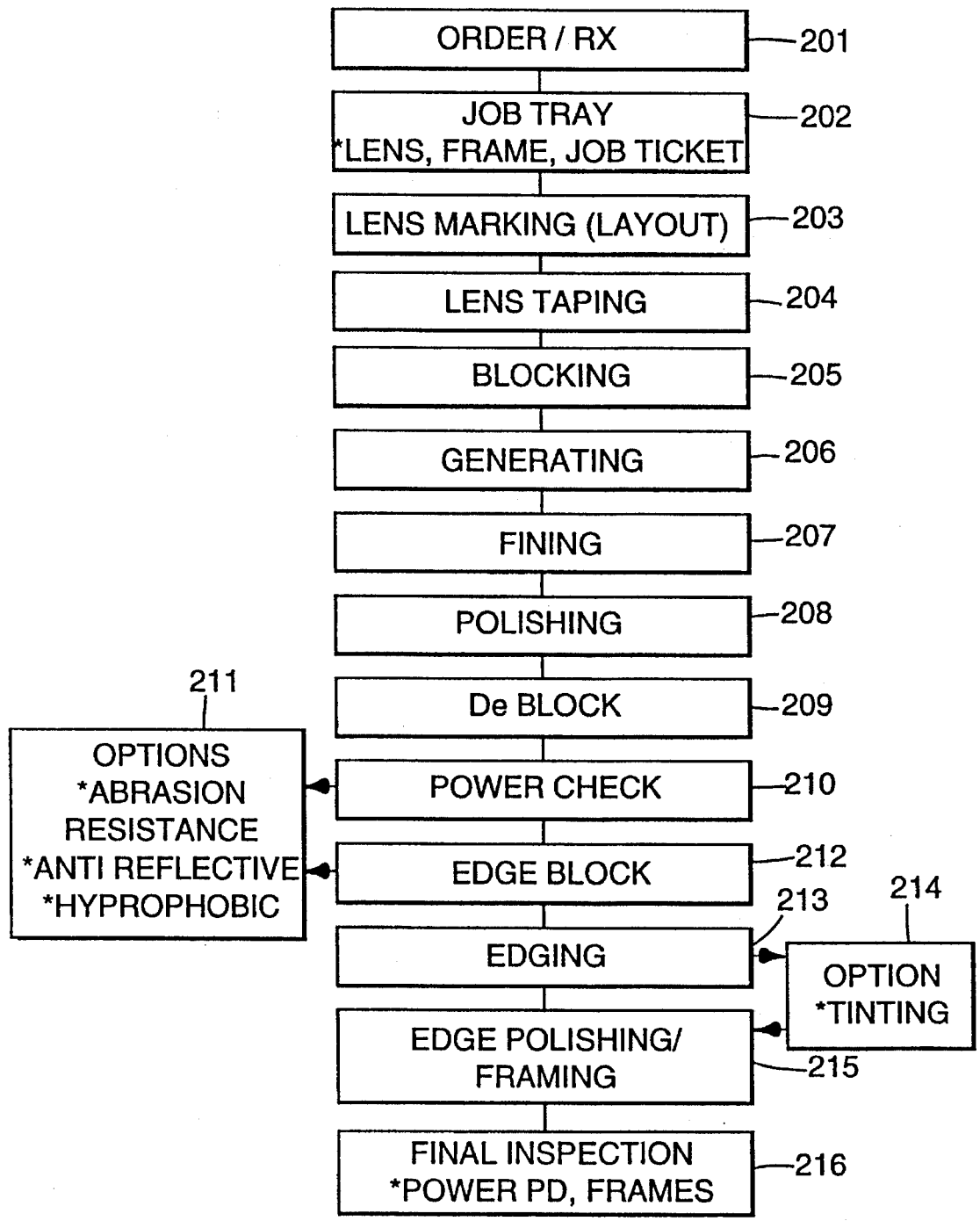
FIG. 14 is a flowchart illustrating an example of a method for processing an ophthalmic lens according to the present invention.

The present invention may alternatively be described as a method for altering a lens. FIG. 14 is a flowchart which illustrates a method for processing an ophthalmic lens.

Figure 1:
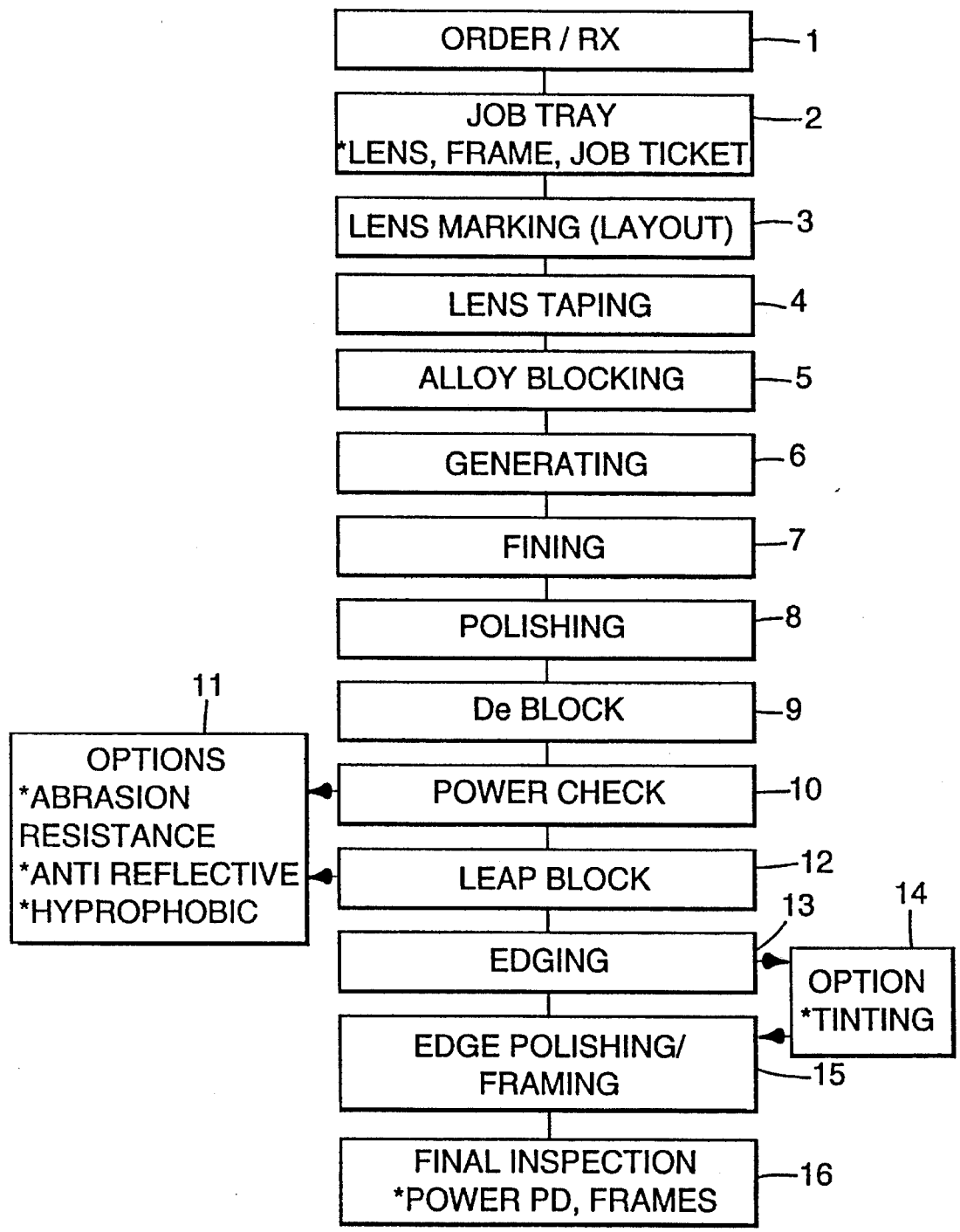
FIG. 1 is a flowchart illustrating an example of a prior art method for processing an ophthalmic lens.

Similar to steps 1 and 2 of the prior art process shown in FIG. 1, after a particular lens is ordered 201, a job tray is selected 202 which includes an appropriate lens blank (e.g. a semi-finished lens blank), an appropriate lens block (e.g. one with a surface having a radius of curvature similar, but not necessarily identical, to the radius of curvature of the finished surface of the semi-finished block). As stated above in example 1, it has been found that the radius of curvature of the finished side of the lens blank need not be identical to the radius of curvature to the arcuate (concave) surface 29 of the lens block. Thus, a single lens block may be used with several different semi-finished lenses which have differing radius of curvature.

In step 203, a center axis line is drawn on lens surface 42, convex side, under tape T (e.g. prior to placement of tape T on the lens blank). In step 204 the structured surface tape T is placed on the lens blank by manually pressing the tape T on the lens blank 40 or by use of a machine such as the Surface Saver applicator as described in Example 1, or by providing a structured surface integrally with the lens.

Prior to step 205, the lens block is also provided with a structured surface by manually pressing the tape T onto the concave surface 29 of the lens block, using a machine, or by providing the structured surface integral with the lens block.

In step 205 the lens blank is "blocked" to the lens block by pressing the structured surface of the lens blank against the structured surface of the lens block to releasably attach the lens blank to the lens block, such that the inclined sides of lens blank's tapered elements are frictionally adhered to the lens block's tapered elements. This step may be accomplished manually or by means of an automatic process for pressing the block and blank together.

The lens blank is carefully aligned relative to the lens blank by positioning a line formed by metal inserts 19 relative to the center axis line drawn on the lens surface, similar to the alignment steps in example 1.

The lens blank is then processed in steps 206, 207 and 208 by, for example, machining a surface on the unfinished side of the lens blank by using lens generating, fining and polishing devices known in the art.

The machined lens blank is removed from the lens block in step 209 by use of a deblocking device such as the device 74 shown in FIG. 11, or any suitable device. Steps 210 and 211 (power check and options) are similar to steps 10 and 11 of FIG. 1.

The lens is edged in step 213 by, for example, the steps in Example 2. Optionally, the lens blank may be tinted in step 214.

In step 215 the lens is polished and framed during which time it may be held by a mechanical attachment means as described herein. Finally, in step 216 the lens is checked for characteristics such as power and pupillary distance (PD).

The present invention has now been described with reference to several embodiments thereof. It will be apparent to those skilled in the art that many changes or additions can be made in the embodiments described without departing from the scope of the present invention. For example, each of the "failures" shown in Table 1 are believed readily remedied by, for example, (1) customizing the lens block for the shape of the lens blank, (2) changing the geometry and orientation of the tapered elements of the tape T, or (3) changing the material used to construct the tape T. Thus, the scope of the present invention should not be limited to the structures described in this application, but only by structures described by the language of the claims and the equivalents of those structures.

What is claimed is:

1. A method for processing a lens blank comprising the steps of:

providing the lens blank having first and second major side surfaces and a peripheral edge surface, providing a structured surface on one of the first or second side surfaces of the lens blank wherein the structure surface comprises a plurality of tapered elements, each element having at least one side inclined relative to a common surface at an angle sufficient to form a taper, providing a lens block comprising a housing having a first mounting surface for releasably attaching the lens block to a processing means, and a second structured surface wherein the second structured surface comprises a plurality of tapered elements, each element having at least one side inclined relative to a common surface at an angle sufficient to form a taper, pressing the structured surface of the lens blank against the structured surface of the lens block to releasably attach the lens blank to the lens block, such that the inclined sides of lens blank's tapered elements are frictionally adhered to the lens block's tapered elements, processing the lens blank with the processing means, and removing the processed lens blank from the lens block.

2. A method for processing a lens blank according to claim 1 wherein the step of providing a structured surface on one of the first or second major side surfaces of the lens blank comprises the step of:

adhering a tape having said structured surface to the lens blank.

3. A method for processing a lens blank according to claim 1 wherein the step of providing a structured surface on one of the first or second major side surfaces of the lens blank comprises the step of:

providing an integral, monolithic lens blank having said structured surface.

4. A method for processing a lens blank according to claim 1 wherein the step of providing a lens block comprising a housing having a first mounting surface for releasably attaching the lens block to a processing means, and a second structured surface wherein the second structured surface comprises a plurality of tapered elements, comprises the step of:

providing an integral, monolithic lens block having said second structured surface.

5. A method for processing a lens blank according to claim 1 wherein the step of providing a lens block comprises providing a generator block.

6. A method for processing a lens blank according to claim 1 wherein the step of providing a lens block comprises providing an edging block.

7. A method for processing a lens blank according to claim 1 further comprising the step of removing the structured surface from the first or second major side of the lens blank.

8. A method according to claim 7 wherein the structured surface on the lens blank is provided by adhering a tape having said structured surface to the lens blank and the step of removing the structured surface comprises peeling the tape from the lens blank.

9. A method for processing a lens blank according to claim 1 wherein the step of providing a lens block comprising a housing having a first mounting surface for releasably attaching the lens block to a processing means, and a second structured surface wherein the second structured surface comprises a plurality of tapered elements, comprises the step of:

adhering a tape having said second structured surface to the housing of the lens block.

* * * * *